United States Patent
Alter et al.

(10) Patent No.: US 12,054,429 B2
(45) Date of Patent: Aug. 6, 2024

(54) CERAMIC HONEYCOMB BODY FOR LIGHTWEIGHT STRUCTURES AND CORRESPONDING PRODUCTION METHOD

(71) Applicant: Euro-Composites S.A., Echternach (LU)

(72) Inventors: Rolf-Mathias Alter, Echternach (LU); Willy Wintgens, Troisvierges (LU); Carsten Huberty, Leiwen (DE); Darius Kaminski, Ferschweiler (DE)

(73) Assignee: EURO-COMPOSITES S.A., Echternach (LU)

( * ) Notice: Subject to any disclaimer, the term of this patent is extended or adjusted under 35 U.S.C. 154(b) by 619 days.

(21) Appl. No.: 17/056,106

(22) PCT Filed: May 20, 2019

(86) PCT No.: PCT/EP2019/063000
§ 371 (c)(1),
(2) Date: Jun. 7, 2021

(87) PCT Pub. No.: WO2019/219976
PCT Pub. Date: Nov. 21, 2019

(65) Prior Publication Data
US 2021/0291479 A1    Sep. 23, 2021

(30) Foreign Application Priority Data
May 18, 2018  (LU) .......................................... 100801

(51) Int. Cl.
*C04B 35/565*  (2006.01)
*B32B 3/12*    (2006.01)
(Continued)

(52) U.S. Cl.
CPC .............. *C04B 35/565* (2013.01); *B32B 3/12* (2013.01); *B32B 5/024* (2013.01); *B32B 18/00* (2013.01);
(Continued)

(58) Field of Classification Search
None
See application file for complete search history.

(56) References Cited

U.S. PATENT DOCUMENTS 5,067,999 A   11/1991 Streckert et al.
9,028,914 B2   5/2015 Han et al.
(Continued)

FOREIGN PATENT DOCUMENTS

CN  108297494 A  *  7/2018  ............... B32B 3/12
DE  10008686 A1    9/2000
(Continued)

OTHER PUBLICATIONS

Machine translation of CN 108297494 A from EPO via espacenet (translated Jun. 30, 2023) (Year: 2018).*
(Continued)

*Primary Examiner* — Elizabeth Collister
(74) *Attorney, Agent, or Firm* — Panitch Schwarze Belisario & Nadel LLP (57) ABSTRACT

A honeycomb body made of a composite material for fire-resistant lightweight structures including honeycomb cells having a cross section is provided. The cell walls of the honeycomb cells are produced from a composite material. The composite material has at least one carrier, for example a woven fabric or a laid fabric made of fibers, and a matrix into which the carrier is embedded. The matrix includes a silicon-based ceramic material, of which the proportion by mass in the matrix along the cell walls is at least 30 wt. %. A method for producing such a ceramic honeycomb body (Continued)

and a honeycomb tube as an intermediate product for the same are also provided. A flat semi-finished product as a curable intermediate product for the production of fire-resistant fiber composite lightweight structures, which has a matrix mixture including dispersed silicon particles, is also provided.

22 Claims, 2 Drawing Sheets

(51) Int. Cl.
| | |
|---|---|
| *B32B 5/02* | (2006.01) |
| *B32B 18/00* | (2006.01) |
| *C04B 35/571* | (2006.01) |
| *C04B 35/584* | (2006.01) |
| *C04B 35/589* | (2006.01) |
| *C04B 35/597* | (2006.01) |
| *C04B 35/628* | (2006.01) |
| *C04B 35/65* | (2006.01) |
| *C04B 35/80* | (2006.01) |
| *C04B 38/00* | (2006.01) |

(52) U.S. Cl.
CPC .......... *C04B 35/571* (2013.01); *C04B 35/584* (2013.01); *C04B 35/589* (2013.01); *C04B 35/597* (2013.01); *C04B 35/62863* (2013.01); *C04B 35/62892* (2013.01); *C04B 35/65* (2013.01); *C04B 35/80* (2013.01); *C04B 38/0006* (2013.01); *B32B 2250/40* (2013.01); *B32B 2307/3065* (2013.01); *C04B 2235/3826* (2013.01); *C04B 2235/3895* (2013.01); *C04B 2235/5232* (2013.01); *C04B 2235/5248* (2013.01); *C04B 2235/5256* (2013.01); *C04B 2235/616* (2013.01); *C04B 2235/656* (2013.01)

(56) References Cited

U.S. PATENT DOCUMENTS

| | | |
|---|---|---|
| 9,631,519 B2 | 4/2017 | Fouquet et al. |
| 2016/0003106 A1* | 1/2016 | Fouquet ................ C04B 37/005 427/255.12 |
| 2017/0190628 A1 | 7/2017 | Easter et al. |
| 2020/0247971 A1* | 8/2020 | Cavalli ................... B32B 27/04 |

FOREIGN PATENT DOCUMENTS

| | | |
|---|---|---|
| DE | 10 2005 058034 A1 | 8/2006 |
| EP | 3 050 862 A2 | 8/2016 |
| EP | 3 279 055 A1 | 2/2018 |
| RU | 2646061 C2 | 3/2018 |
| WO | 01/98207 A1 | 12/2001 |
| WO | 03/043933 A1 | 5/2003 |
| WO | 2010/043783 A1 | 4/2010 |

OTHER PUBLICATIONS

Office Action issued Sep. 14, 2022 with Search Report in Application No. RU 2020136368/03(067048) (English machine translation).
Office Action issued Sep. 26, 2023 in CA Application No. 3100744.
Int'l Search Report issued in Int'l Application No. PCT/EP2019/063000.
Int'l Preliminary Report on Patentability issued Aug. 27, 2020 in Int'l Application No. PCT/EP2019/063000.

* cited by examiner

CERAMIC HONEYCOMB BODY FOR LIGHTWEIGHT STRUCTURES AND CORRESPONDING PRODUCTION METHOD

CROSS-REFERENCE TO RELATED APPLICATIONS

This application is a Section 371 of International Application No. PCT/EP2019/063000, filed May 20, 2019, which was published in the German language on Nov. 21, 2019, under International Publication No. WO 2019/219976 A1, which claims priority under 35 U.S.C. § 119(b) to Luxembourg Application No. LU100801, filed May 18, 2018, the disclosures of each of which are incorporated herein by reference in their entireties.

The invention relates to a honeycomb body of a composite material for high temperature-resistant, in particular fire-resistant, lightweight structures, in particular for use as a core or for producing a core between two cover layers of a lightweight sandwich structure. The invention further relates to a method for producing such a honeycomb body, to a honeycomb blank for producing a honeycomb body and to a heat-resistant lightweight sandwich structure.

Fiber composite materials are conventionally distinguished by long fibers embedded in a matrix. The long fibers act as a support or skeleton for imparting desired mechanical properties to the composite materials.

Ceramic fiber composite materials typically have a ceramic matrix. The term ceramic (s) here very generally denotes both crystalline and amorphous ceramic materials.

Composite materials of pure carbon, such as for example carbon fiber-reinforced carbons, can be used at high temperatures under a vacuum or a protective gas but oxidize in air.

Composite materials for high temperature-resistant or fire-resistant lightweight structures, such as for example for producing protective cladding for the aerospace sector, conventionally comprise porous ceramic materials reinforced by carbon fibers or silicon carbide fibers, for example carbide ceramic materials such as silicon carbide. Silicon carbide has elevated oxidation resistance.

Fiber-reinforced carbide ceramic materials may be produced by pyrolyzing or carbonizing a fiber-reinforced blank in order to convert organic material into elemental carbon and obtain a fiber-reinforced carbon structure which is then siliconized.

Siliconization is conventionally achieved, for example by infiltration with liquid silicon (LSI: liquid silicon infiltration) and exposure to heat at temperatures of >1410° C. (melting point of silicon). Siliconization results in at least some of the carbon bonding with the silicon and being converted into silicon carbide.

Lightweight engineering makes widespread use of sandwich components comprising two cover layers and a core structure in the form of a honeycomb body.

A method for producing carbide ceramic sandwich components comprising honeycomb bodies as the core structure is already known. Application EP 3 050 862 A2 describes a method for this purpose in which a component with a sandwich structure is produced from two cover layers and a honeycomb body between the cover layers, wherein the cover layers and the honeycomb body are provided as separate open-pored carbon bodies by pyrolysis of a prepreg material and, after pyrolysis, are bonded, for example adhesively bonded, to form a sandwich component. Then, the already bonded sandwich component is siliconized, i.e. silicon carbide is formed, using the LSI method, i.e. by infiltration with liquid silicon.

During conventional siliconization by infiltration with liquid silicon at temperatures which are above the melting point of silicon, the silicon spreads by capillary action in the porous component and reacts with the carbon on the walls of the capillary to form silicon carbide. The range of capillary action in relation to component height is naturally limited due to the effect of gravity. Moreover, some capillaries may become "blocked" due to adhesion of already formed silicon carbide which not only slows the process of siliconization but additionally makes it more difficult to achieve a uniform distribution of silicon carbide over the component height. The latter phenomenon is disadvantageous for the reproducibility of the method and the uniformity of the product. For instance, local excesses of unbound silicon may remain in the component. The excess silicon may possibly also react with carbon fibers in the support and consequently degrade the fibers, so impairing mechanical properties. The excess silicon has to be removed in additional method steps (which include vaporizing the silicon at a temperature of over 2000° C.), so increasing production costs.

A first object of the present invention is accordingly to provide a honeycomb with improved characteristics which, in comparison with the prior art, is inexpensive to produce and is in particular suitable for fire-resistant lightweight structures or for high-temperature applications, for example for producing a core for fire-resistant lightweight sandwich structures. This object is achieved by the honeycomb body as claimed in claim 1, and independently thereof by the honeycomb blank as claimed in claim 21.

A further object is to propose a simplified production method for fiber-reinforced ceramic honeycomb bodies, if possible with elevated reproducibility. This object is achieved by the method as claimed in claim 8 also by the further method as claimed in claim 10.

The term "fire-resistant" here denotes a material which is suitable for a service temperature of above 600° C. (irrespective of the pyrometric cone equivalent and/or the presence of a specific chemical reaction).

A honeycomb body of the type in question comprises honeycomb cells with a cross-section in the L/W plane, in particular a polygonal, preferably approximately hexagonal cross-section, wherein the cell walls of the honeycomb cells are produced from a composite material which comprises at least one support, in particular a woven or laid fiber fabric, and a matrix. The support is here embedded in the matrix in the manner of a composite material. A honeycomb body of the type in question is suitable among other things for use as or for producing a core of a lightweight sandwich structure, wherein the core may be arranged between two cover layers and firmly bonded thereto.

The above-stated first object is already achieved by the matrix comprising a silicon-based ceramic material selected from the group consisting of silicon carbide, silicon oxycarbide, silicon nitride, silicon carbonitride and silicon-boron carbonitride, wherein, over the entire height of the cell walls in the T direction perpendicular to the L/W plane of the honeycomb cells, the matrix has a mass fraction of the silicon-based ceramic material of at least 30 wt. %, in particular of at least 40 wt. % and preferably of more than 80 wt. %.

The matrix may in particular comprise silicon carbide. Silicon carbide is distinguished by extraordinary high-temperature resistance, wear resistance and elevated oxidation resistance. The absence of oxygen in silicon carbide may have a positive impact on the durability of the composite material.

According to one aspect of the invention, the matrix thus has, in particular relative to the matrix per se (without the support), a mass fraction of the silicon-based ceramic material, for example silicon carbide, silicon oxycarbide, silicon nitride, silicon carbonitride or silicon-boron carbonitride, of at least 30 wt. %, in particular of at least 40 wt. % and preferably of more than 80 wt.& over the entire height of the cell walls of the honeycomb cells, i.e. continuously over the height at each macroscopic height plane (in the millimeter range).

In other words, if the honeycomb body were notionally cut into a plurality of layers of a height of a few millimeters perpendicular to the T direction over the entire height of the cell walls, the mass fraction of one of the above-stated silicon-based ceramic materials, for example silicon carbide, in the matrix in each of these layers amounts to at least 30 wt.&, in particular at least 40 wt. % and preferably more than 80 wt. 8. This in particular also applies to the central layers of the honeycomb body which are located at approximately half the height of the cell walls.

By sampling the matrix material from the two outer regions relative to the T direction of the honeycomb body according to the invention and from the central region with regard to the T direction of honeycomb body and analytically determining the fraction of one of the above-stated silicon-based ceramic materials, for example of the silicon carbide fraction, in the samples taken in this manner, it is straightforward to establish whether the mass fraction of the silicon-based ceramic material, for example of the silicon carbide, in the samples in each case amounts to at least 30 wt. %, in particular at least 40 wt. % and preferably more than 80 wt. %. This analysis moreover very highly probably makes it possible to conclude that the mass fraction according to the invention of the silicon-based ceramic material is present over the entire height of cell walls in the T direction.

Suitable analytical methods for determining the mass fraction of one of the above-stated silicon-based ceramic materials, for example silicon carbide, are known to a person skilled in the art. The present quantitative values regarding the completely cured matrix or finished fiber composite, in particular with regard to mass fractions, are based on X-ray spectroscopy, namely energy-dispersive X-ray analysis (SEM-EDX). Other possible analytical methods could be for example wavelength-dispersive X-ray spectroscopy (SEM-EPMA), X-ray diffractometry (XRD, XRPD), photoluminescence spectroscopy, including Auger spectroscopy, photoelectron spectroscopy and photoemission spectroscopy, in particular X-ray photoelectron spectroscopy and ESCA for chemical analysis.

Mass fractions of individual components in a mixed phase are here generally stated to DIN 1310 in weight percent "wt. %" and are calculated as the percentage fraction of the weight of the component in the weight of the mixed phase. Silicon carbide is here designated SiC according to its chemical formula.

The mass fraction of the silicon-based ceramic material, for example SiC, in the matrix preferably amounts to at least 90 wt. %, preferably at least 95 wt. % and particularly preferably at least 99.5 wt. %. A large proportion of for example SiC is particularly advantageous for the material's oxidation resistance and wear resistance.

In one preferred embodiment, the mass fraction of the silicon-based ceramic material, for example SiC, in the matrix deviates in the central region along the T direction by less than 20 wt. %, in particular by less than 10 wt. % and preferably by less than 1 wt. %, from the mass fraction of SiC in the matrix in the end regions of the height of the cell walls. A maximally homogeneous distribution of the silicon-based ceramic material, for example Sic, in the honeycomb body is advantageous for the stability of the honeycomb body. A uniform distribution is moreover advantageous for subsequently cutting the honeycomb body, since all planes have substantially constant characteristics, the structure namely typically being cut into slices perpendicular to the T direction to yield honeycomb slices of a desired height.

The silicon-based ceramic material is here generally intended to mean a silicon-based ceramic material as stated above selected from the group consisting of silicon carbide, silicon oxycarbide, silicon nitride, silicon carbonitride and silicon-boron carbonitride.

Honeycomb cells of a honeycomb body preferably have cell walls which extend perpendicular to the L/W plane such that the honeycomb cells have a constant cross-section perpendicular to the T direction in different planes along the T direction. At least a majority of the honeycomb cells of a honeycomb body preferably extends continuously and with an approximately constant cross-section from one side of the honeycomb body to an opposite side of the honeycomb body.

The matrix may have a mass fraction of free silicon of at most 15 wt. %, in particular at most 10 wt. %, preferably at most 2 wt. and particularly preferably at most 0.5 wt. 8. The free silicon (chemically unbound silicon), i.e. silicon which is not bound in chemical compounds, may be present or remain as a remnant of metallic silicon which was used during production of the matrix (see below). A matrix with a vanishingly small metallic silicon fraction is particularly advantageous for producing radar-transparent composite materials.

Regarding the previously listed spectroscopy methods, the SEM-EDX method is likewise well suited to determining the free silicon content in the matrix. X-ray diffractometry (XRD, XRPD) could also be considered.

The matrix particularly preferably includes substantially no free silicon. This counteracts spot formation or the local accumulation of metallic silicon and also leads to improved dielectric characteristics of the honeycomb body, for example for use as a radar-transparent component ("stealth technology").

In particular, a mass fraction of organic carbon compounds in the matrix amounts to at most 5 wt. %, preferably at most 0.5 wt. %. The mass fraction of organic carbon compounds in the matrix is intended to mean the mass fraction all organic carbon-containing substances which may be present in the matrix. Organic carbon compounds may for example remain as residues of various organic substances which were used during production of the matrix and may not have been completely pyrolyzed or carbonized. The matrix particularly preferably contains substantially no residues of organic substances. The mass fraction of residual organic carbon compounds in the matrix may for example be checked by pyrolyzing a sample of the matrix and comparing the weight of the sample before and after pyrolysis.

In contrast, the matrix preferably has a certain excess of free carbon, i.e. not siliconized and otherwise chemically unbound elemental carbon which is not bound to chemical compounds. The matrix preferably has a mass fraction of free carbon of at least 1 wt. % and in particular at least 10 wt. %, but at most of 25 wt. % or preferably at most 158. An excess of free carbon in the matrix is advantageous in particular for composite materials with a support of carbon fibers because the carbon fibers of the support cannot be attacked and embrittled at high temperatures by any remaining free silicon. A predetermined excess of free carbon may additionally make it possible to minimize residual fractions of free silicon if suitable parameters are established for SiC formation (see below).

The mass fraction of the support in the composite material, i.e. relative to the composite material as a whole, may amount to 5 wt. % to 80 wt. % and preferably 10 wt. % to 50 wt. %.

The support is preferably produced from fibers.

The support may in particular be produced from a woven fabric, preferably from a single-ply woven fabric and particularly preferably from a linen weave fabric.

The support may in particular comprise carbon fibers. The support may for example take the form of a fiber structure or fiber skeleton of carbon fibers. The support may alternatively or additionally include ceramic fibers, for example also of SiC. Other carbon-containing supports or supports of other high temperature-resistant fibers such as for example basalt fibers are also within the scope of the invention. The support may also be produced from a combination of different, preferably high temperature-resistant, fibers.

The support may comprise glass fibers, in particular be produced from glass fibers, wherein the glass fibers are preferably silicate glass fibers and particularly preferably silica glass fibers. A support of silica glass fibers is in particular advantage for aeronautical applications.

In one embodiment, the matrix comprises silicon carbide and the support comprises carbon fibers.

In one embodiment, the matrix comprises silicon oxycarbide and the support comprises silicate glass fibers and preferably silica glass fibers. A honeycomb body according to this embodiment is in particular suitable for aeronautical applications.

In a preferred embodiment, the support is made from a woven fabric, particularly preferably from a linen weave fabric. Unlike in the LSI method, the capillarity or porosity of the support is not a decisive factor here. A certain degree of porosity may nevertheless be advantageous for uniform formation of the silicon-based ceramic material, for example SiC.

The support is preferably produced from a woven carbon fiber fabric. Conventional commercial woven carbon fiber fabrics may be used for this purpose.

The support may be produced from a glass fiber fabric and preferably from a silica glass fiber fabric and/or silicate glass fiber fabric.

Fiber fineness of the support material may amount to between 1 and 50 K, in particular between 3 and 12 K and particularly preferably 3 K, wherein for example 1 K means that 1000 filaments are brought together to form a tow. Preferred basis weights for selection of a support material (prior to completion of the composite) are defined further below. The fineness of the fibers in mm may be approximately determined from the diameter of a filament, for example of a per se known carbon fiber or silica glass fiber, and the number of filaments in a fiber, for example 1000 for 1K fibers.

The support preferably takes the form of a single-ply woven fabric. This makes it possible, among other things, to produce small honeycomb cells or honeycombs with a low bulk density.

In one embodiment, the honeycomb cells are hexagonal unit cells, in particular hexagonal unit cells with a free diameter in the L/W plane of ≤ 50 mm, in particular of ≤ 19.2 mm, preferably ≤ 9.6 mm and particularly preferably ≤ 3.2 mm. The free diameter is here taken to mean the distance in the L/W plane between two mutually parallel cell walls of a hexagonal unit cell.

The invention further relates to a method for producing a honeycomb body, in particular a honeycomb body of a composite material for fire-resistant lightweight structures, the method comprising:
  providing a support material, in particular a woven or laid fiber fabric,
  forming the support material into a support in the form of a honeycomb with honeycomb cells, the cell walls of which are formed from the support material, in particular by forming into a honeycomb block by the expansion method,
  impregnating the support, for example by a dipping method or the like, with a liquid, carbon-containing matrix mixture which may comprise organic constituents such as for example a solution and/or a suspension of an organic polymer or polymer precursors in a solvent, wherein the matrix mixture comprises silicon particles dispersed according to the invention, i.e. in particular metallic silicon, such that the cell walls of the honeycomb cells are impregnated over their full height with the matrix mixture, in order to provide an impregnated honeycomb blank,
  heating the impregnated honeycomb blank to a pyrolysis temperature of 400-1200° C., and carbonizing the carbon-containing matrix, such that the organic constituents of the matrix mixture are carbonized and a porous carbon matrix also incorporating the silicon particles is obtained,
  heating to a siliconization temperature, i.e. the temperature at which silicon melts, for example at 1410-1650° C., to liquefy the silicon particles and to siliconize the carbonized matrix with the formation of silicon carbide (SiC).

The proposed method enables the production of honeycomb bodies or a honeycomb according to one of the embodiments described further above. The proposed method is suitable in particular for producing a honeycomb body from a carbide ceramic composite material with a support of carbon and/or silicon carbide fibers and with a matrix comprising silicon carbide.

The method steps are preferably carried out in the stated order, wherein additional intermediate steps are possible. In particular, before being transformed into honeycomb form, the support material may for example be impregnated or preimpregnated with the matrix mixture which comprises silicon particles. The term matrix mixture here denotes the incompletely cured, in particular uncarbonized, precursor of the matrix in the final product.

Carbonization or pyrolysis in particular decomposes organic compounds at high temperatures, for example >400° C., to form free, chemically unbound carbon. This may in particular proceed under atmospheric pressure in an inert gas atmosphere, for example in a nitrogen-blanketed furnace. All the organic carbon, with the exception of any remnants, can here be converted into elemental carbon.

During siliconization, the liquid or molten silicon which has been liquefied by temperatures above its melting point, i.e. above approx. 1410° C., reacts with the carbon of the matrix to form silicon carbide (SiC). The reaction may in particular proceed under a slight vacuum or at a reduced pressure, for example at a pressure of <5 mbar and/or in an inert gas-blanketed furnace.

One advantage among others of the method according to the invention is that the quantity of silicon to be added to the quantity of carbon which may arise from the matrix mixture by pyrolysis is predefined in the matrix used and is accordingly predeterminable or adjustable. If the organic polymer to be used in matrix production is for example a phenolic resin, the mass ratio of phenolic resin precursors to silicon particles in the matrix mixture may be in the range from 1:3 to 3:1 depending on the intended application. A person skilled in the art knows how to take account of the carbon yield of the pyrolysis step for a specific matrix mixture and selected pyrolysis conditions and/or can determine it experimentally using known methods.

In particular, in contrast with the prior art, there is no need to add silicon after the completion of pyrolysis, since the desired amount of silicon particles is already present or has been introduced into the matrix from the outset. This simplifies process and plant engineering.

Dispersing the silicon particles in the matrix mixture prior to impregnation very considerably simplifies ensuring a maximally uniform distribution of the silicon particles, at least also a minimum fraction of SiC, also in the direction of the honeycomb height direction, i.e. in the T direction, and thus a maximally homogeneous distribution of the silicon in the impregnated honeycomb blank and in the final product. It is accordingly straightforwardly possible to achieve a mass fraction of SiC in the matrix of the finished honeycomb body of at least 30% and optionally appreciably higher, in particular of at least 80 wt. % and preferably of at least 95.5 wt. #, continuously over the entire height of the cell walls in the T direction perpendicular to the L/W plane, i.e. also in the middle of the honeycomb body. The above-stated drawbacks of the LSI method are inherently avoided.

The per se known dipping method for impregnating the cell walls of the honeycomb cells with matrix mixture involves dipping the support, which has in particular been formed into the form of a honeycomb block, into the matrix mixture and removing the support from the matrix mixture. An adjustable quantity of the matrix mixture remains adhered to the support, this amount being adjustable among other things by the viscosity of the matrix and speed of removal. Impregnation by dipping, dip-impregnation, may proceed in a plurality of steps and optionally also for a sub-region of the support (for example for each half).

A partially coated support may be subjected to heat treatment to precure the matrix mixture, specifically at a temperature at which the matrix mixture at least partially cures or precures, in order to stabilize the matrix. If the matrix mixture comprises precursors for a thermosetting polymer, or a curable, crosslinkable resin, heat treatment may lead to partial or incipient crosslinking or reticulation of the resin. The matrix mixture may be partially cured or precured as a result. The matrix mixture may, however, also be completely cured.

Dipping or dipping and precuring may be repeated a number of times, in particular in three or more iterations, or be carried out in more than one dipping operation such that the support is coated progressively or layer-by-layer to a desired film thickness of the matrix mixture. In this way, a fiber-reinforced carbon structure with a desired matrix fraction, i.e. with a desired mass fraction of the matrix in the composite material, may be obtained.

The known LSI method does not provide comparable degrees of freedom.

It is, however, also possible to carry out the dipping method in just one step with a single dipping operation. The honeycomb block is preferably oriented during dipping in such a way that the movement during immersion and removal extends perpendicular to the L/W plane, or along the T direction.

In particular in the case of iterative dip-impregnation, the step of carbonization or pyrolysis (or the two steps of carbonization and siliconization) may also proceed iteratively or in a plurality of passes or repeats, for example depending on desired the wall thickness of the honeycomb cell walls, in particular may be repeated up to ten times, preferably twice. Among other things, it is possible in this way to control SiC formation, which should preferably result in as far as possible complete minimization of free Si, where possible without impairment of the carrier structure. Excessive repetition should, however, be avoided.

The invention further relates to another method for producing a honeycomb body, in particular a honeycomb body of a composite material for fire-resistant lightweight structures, the method comprising:

providing a support material, in particular a woven or laid fiber fabric, forming the support material into a support in the form of a honeycomb with honeycomb cells, the cell walls of which are formed from the support material, in particular forming it into a honeycomb block by an expansion method, impregnating the support with a matrix mixture which comprises at least one silicon-containing polymer precursor, in particular a polycarbosilane, a polycarbosiloxane, a polysiloxane, polysilazane, a polysilane, a polycarbosilazane, a copolymer with two or more of the above-stated compounds and/or a mixture with two or more of the above-stated compounds, such that the cell walls of the honeycomb cells are impregnated with the matrix mixture, in order to provide a corresponding honeycomb blank, heating the impregnated honeycomb blank to a pyrolysis temperature, in particular a pyrolysis temperature of ≤ 1100° C., preferably ≤ 1000° C. and particularly preferably of up to 900° C., for the purpose of forming a matrix which contains a silicon-based ceramic material, in particular silicon carbide, silicon oxycarbide, silicon nitride, silicon carbonitride and/or silicon-boron carbonitride.

The above method is in particular advantageous for honeycomb bodies of glass fiber-reinforced ceramics, for example for aeronautics, since temperatures below the melting temperature of glass, for example of silica glass, are used for ceramic production.

The matrix mixture according to this method contains the silicon-containing polymer precursors, known as prepolymers or preceramic polymers, which can be converted into silicon-based ceramic materials by exposure to temperatures in excess of 400° C. The polymer precursors thus constitute a starting material for producing ceramics. Polymer precursors of the substance classes of polycarbosilanes, polycarbosiloxanes, polysiloxanes, polysilazanes, polysilanes, and polycarbosilazanes may in particular be present individually or in combination in the matrix mixture, in particular also as copolymers, i.e. polymers which comprise various of the above-stated precursors in their polymer chains. The polymer precursors of the above-stated substance classes may also be present as a mixture in the matrix mixture. Polymer precursors of the substance class of polycarbosilanes in particular comprise HPCs (hyperbranched polycarbosilanes), AHPCs (allyl hyperbranched polycarbosilanes) and/or alkoxy-substituted polycarbosilanes.

Polymer precursors may be functionalized or have functional groups, for example mono-, di-, and/or polyfunctional groups. The functional groups may be distributed on the polymer chain and/or arranged at the ends thereof. The groups may be for example hydroxy, amino or alkoxy groups, and/or for example carboxylates, acrylates, isocyanates, epoxides, ethers, silanes, alkoxysilanes, trimethoxysilanes and/or vinyls. Polymer precursors may have a combination of various of the above-stated groups.

The proposed method enables the production of honeycomb bodies or a honeycomb according to one of the embodiments described further above. The proposed method is in particular suitable for producing a honeycomb body from a composite material with a support of silica glass fibers and with a matrix comprising a silicon-based ceramic material selected from the group consisting of silicon carbide, silicon oxycarbide, silicon nitride, silicon carbonitride and silicon-boron carbonitride. The method is particularly advantageous for the production of honeycomb bodies for use as a core for producing heat-resistant lightweight sandwich structures for aeronautics.

The method steps are preferably carried out in the stated order, wherein additional intermediate steps are possible. In particular, before being formed into honeycomb form, the support material for example may be impregnated or preimpregnated with the matrix mixture. The term matrix mixture here denotes the incompletely cured, in particular uncarbonized, precursor of the matrix in the final product.

Impregnation may in particular be carried out in the above-stated dipping method and may be carried out repeatedly in order to establish a desired bulk density of the honeycomb blank.

The support material may in particular be produced in the form of an open-pored air-permeable fiber structure and preferably comprise glass fibers, preferably silicate glass fibers and particularly preferably silica glass fibers.

In one embodiment, the matrix mixture comprises polyborazylene. This permits the production of a silicon-boron carbonitride-containing matrix.

The support material is preferably provided in the form of an open-pored air-permeable fiber structure and in particular comprises carbon fibers and/or ceramic fibers. The term "open-pored" means that the fiber structure is permeable to a gaseous or liquid medium. Pores are generally taken to mean cavities in a material, in particular cavities having diameters which are approximately in the 1 to 1000 micrometer range. Pores in the fiber structure are here also taken to mean cavities between individual fibers or fiber bundles. A certain degree of porosity prior to impregnation with matrix is advantageous for ensuring thorough impregnation.

Prior to impregnation, the support thus preferably has a level of air permeability to assist impregnation with the matrix material, in particular an air permeability of at least 10 l/dm$^2$/min to DIN EN ISO 9237.

The support material is preferably single ply, at least prior to forming.

The basis weight of the support material (without matrix) may amount to between 25 g/m$^2$ and 1000 g/m$^2$ and preferably between 50 g/m$^2$ and 400 g/m$^2$. In the case of a low basis weight of the support, it is possible to produce smaller honeycomb cells and/or honeycombs with a low bulk density.

The support material may comprise a woven fabric, in particular a linen weave fabric, preferably with a porosity of 2 vol. % to 40 vol. % and particularly preferably of 20 vol. % to 30 vol. %, wherein porosity means a fraction by volume of pores in the support material, and/or with a mesh size of 100 to 800 µm and preferably of 200 to 500 µm. The initial porosity and/or mesh size may of course be modified prior to forming by preimpregnating the support material.

The porosity of the material after carbonization and siliconization or after pyrolysis may, depending on the degree of coating, amount to 0 vol. % to 30 vol. 8. Porosity may be investigated for example by X-ray or ultrasound methods.

The silicon particles dispersed in the matrix mixture may have a grain size distribution of 0.001 to 1 mm and preferably of 0.008 to 0.09 mm. The advantage of the smallest possible particles is that they can be better distributed in the support.

The silicon powder which is preferably to be used may have a degree of purity of 75 to 99.99%.

The mass fraction of silicon particles in the matrix mixture prior to complete curing preferably amounts to 20 wt. % to 60 wt. % and preferably 25 wt. % to 45 wt. %.

In one embodiment of the method, the matrix mixture comprises at least one precursor for a thermosetting polymer. The precursor for a thermosetting polymer may be present in the matrix mixture in solvent-dissolved form. It may for example be phenolic resin precursors dissolved in for example isopropanol. Further resin systems which may be added to the matrix mixture comprise epoxy, polyimide, cyanate ester, and/or polyester resin.

The viscosity of the matrix mixture may be adjusted by the addition of solvents which are suitable for the corresponding resin systems in order to improve wettability during impregnation. This applies both to the method with a matrix mixture containing Si particles and to the method with a matrix mixture which contains polymer precursors as a ceramic precursor.

In one embodiment of the method, the matrix mixture may comprise organometallic compounds, metal oxides and/or elemental metals, preferably titanium or aluminum compounds.

In one embodiment of the method, impregnation is followed by a partial or complete curing step in order to precure the matrix mixture, wherein the honeycomb blank impregnated with the matrix mixture is at least precured by exposure to heat. This step may in particular be carried out for honeycomb blanks which are impregnated with precursors of a thermosetting polymer. In a further embodiment, the honeycomb blank may comprise a thermoplastic polymer. Precuring is advantageous for better fixation of the matrix mixture to the support.

The support in the form of a honeycomb block may in particular be produced by an expansion method which comprises the following steps:

providing support material, for example in flat, lamellar or film form or the like, in particular in the form of a roll, applying parallel stripes of an adhesive which extend in the T direction or in the direction of the width of the roll over the width of the roll, in particular over the entire width of the roll, and are spaced apart from one another at regular, in particular uniform, distances in the L direction or longitudinal direction of the roll, i.e. in the unrolling direction of the roll, perpendicular to the T direction, cutting the roll into sheets, preferably identically sized sheets, laying the sheets on one another to form a stack, partially or completely curing the adhesive, for example with exposure to pressure and/or heat such that the stack is processed into a cohesive stack-like block, and expanding the stack or block bonded in this manner in the W direction, i.e. in the stack height direction, such that a honeycomb block with honeycomb cells is obtained.

The size and the shape of the honeycomb cells can be adjusted within wide ranges by the dimensioning and arrangement of the stripes of adhesive on the various sheets and by the arrangement of the sheets relative to one another. Honeycomb bodies with honeycomb cells with extremely varied geometries and sizes fall within the scope of the invention, such as for example honeycomb bodies with honeycomb cells with a polygonal cross-section, in particular technically hexagonal or rectangular honeycomb cells, or with other shapes, for example also champagne glass-like honeycomb cells. The matrix mixture may comprise dispersed additives such as for example boron nitride, silicon carbide, petroleum coke, glass, or carbon nanotubes in order to achieve oxidation characteristics which are suitable for high-temperature applications and/or to achieve a maximally continuous surface, for example for producing mirrors. The matrix mixture may alternatively or additionally also comprise dispersed additives such as for example short fibers, carbon nanotubes and nanoparticles which serve to improve the flow characteristics of the matrix mixture, the mechanical properties of the matrix and/or the bond between matrix and support. The matrix mixture may furthermore comprise dispersed additives such as for example carbon nanotubes and nanoparticles which are suitable for producing composite materials with dielectric characteristics. Radar-transparent components may, for example, be produced in this way.

If impregnation is carried out in more than one dipping operation, additives may preferably only be added to the matrix mixture for the final dipping operation.

The matrix mixture may comprise dispersants, in particular to counteract any agglomeration of silicon particles. Dispersants which may in particular be considered are not only (poly) phosphates, sulfones, carboxylates or polyelectrolytes but also surfactants.

The matrix mixture may comprise a mass fraction of carbon-rich nanoparticles and/or carbon nanotubes of 0.1 wt. % to 20 wt. % to ensure a carbon excess in the matrix.

The matrix mixture may comprise further components, for example a curing agent for thermosets.

In one embodiment of the method, before or after pyrolysis or after siliconization, the honeycomb block is cut into slices transversely of the cell walls of the honeycomb cells, in particular perpendicular to the T direction, in order to produce honeycomb bodies of the desired height. In this way, identical honeycomb bodies or honeycomb slices which have an identical cross-section of the honeycomb cells perpendicular to the T direction are produced.

According to a further aspect, the invention further relates to the use of a honeycomb body as a core for producing a heat-resistant, in particular fire-resistant lightweight sandwich structure, wherein the core is bonded to two cover layers of a ceramic fiber composite material. The honeycomb body may take the form of a honeycomb slice which has been cut perpendicular to the T direction from a block-like honeycomb body. Each cover layer or skin may be produced in the form of a flat single layer or multilayer laminate.

The laminate may in particular be produced by the following steps: coating a support material, in particular a woven or laid fiber fabric, preferably of C fibers and/or SiC fibers, with a curable matrix mixture which comprises a solution and/or a suspension of an organic prepolymer or polymer precursors, in particular of a reactive resin or alternatively of a condensation resin, in a solvent and dispersed silicon particles, cutting the support material into sheets, optionally stacking them and pressing the sheets, pyrolysis and siliconization. The siliconized laminate may optionally be dipped in the silicon-containing matrix mixture and pyrolyzed and siliconized once again. These steps can be repeated. The fiber volume fraction in the laminate may amount to 15 vol. % to 75 vol. % and the mass fraction of the matrix in the laminate may amount to 20 wt. % to 80 wt. %.

The laminate may alternatively be produced by the following steps: coating a support material, in particular a woven or laid fiber fabric, preferably of silica glass fibers, with a curable matrix mixture which comprises a solution and/or a suspension of one or more Si-containing, preceramic polymer precursors, in particular of a reactive resin or alternatively of a condensation resin, cutting the support material into sheets, optionally stacking them and pressing the sheets and pyrolysis. The steps of coating and pyrolysis may be repeated.

The matrix mixture for producing the cover layers may be the same as that used for producing the honeycomb core. It is, however, also possible to use different matrix mixtures for producing the cover layers and the honeycomb core.

In the lightweight sandwich structure, the honeycomb body or honeycomb slice may in particular be arranged between the cover layers in such a manner that the cell walls of the honeycombs are positioned transversely of, in particular perpendicular to, the cover layers.

The honeycomb core may be bonded to the cover layers by applying the matrix mixture in which silicon particles are dispersed as an adhesive layer between the respective cover layer and the honeycomb, heating to the pyrolysis temperature to carbonize the adhesive layer and subsequently heating to the siliconization temperature to form SiC in the adhesive layer.

The matrix mixture for bonding the honeycomb core to the cover layers may be the same as that used for producing the honeycomb core, for example matrix mixture which comprises preceramic precursors. The sandwich structure may then be exposed to a pyrolysis temperature.

Alternatively or additionally, at least one prepreg layer comprising a support material impregnated with a curable matrix mixture which comprises dispersed silicon particles may serve as an adhesive layer between the respective cover layer and the honeycomb.

The matrix mixture, in particular in the prepreg layer, for the adhesive bond may be partially crosslinked or partially cured such that it is at least high in viscosity and tacky, and is readily flowable when heated such that it is capable of forming a resin meniscus with the honeycomb uprights, but not of flowing down the honeycomb uprights. The matrix mixture, in particular of the prepreg layer, may preferably be at the "B stage", which corresponds to a moderate degree of prereaction of the resin, in which the resin is partially crosslinked, pasty and still fusible and curable. The sandwich structure of the cover layers, adhesive layers and honeycomb core may then be heated to the pyrolysis temperature in order to carbonize the adhesive layer and to the siliconization temperature in order to form SiC in the adhesive layer.

The layers, in particular the core and cover layers, of the sandwich structure may be bonded after siliconization of the honeycomb body and after siliconization of the cover layers. It is, however, also possible for not yet carbonized or yet incompletely carbonized or not yet siliconized or yet incompletely siliconized layers to be assembled into a sandwich structure and further processed as a sandwich structure, i.e. to be carbonized and siliconized once they have been bonded together as a sandwich structure. It is thus also possible to assemble the layers which are at different processing stages on assembly into a sandwich structure and then to complete processing on the whole sandwich structure.

Lightweight sandwich structures which are produced as described above are in particular suitable for aerospace applications, for example for producing protective cladding for the compression, combustion and exhaust zones of engines, for producing heat shields, for example in protective thermal cladding for the underside of space shuttles, for rocket outlet nozzles, etc.

According to a further independent aspect, the invention further relates to a honeycomb blank which is suitable as an intermediate product, in particular for producing a honeycomb body of fiber-reinforced carbide ceramics for fire-resistant lightweight structures.

The honeycomb blank comprises honeycomb cells with a cross-section in the L/W plane, in particular a polygonal, for example approximately hexagonal cross-section, wherein cell walls of the honeycomb cells are produced from a support material, in particular from a woven or laid fiber fabric which is impregnated with a carbon-containing matrix mixture which contains silicon particles dispersed according to the invention, wherein the mass fraction of silicon particles in the matrix mixture in the central region of the height of the cell walls along a T direction perpendicular to the L/W plane deviates by less than 20 wt. 8, in particular less than 10 wt. % and preferably by less than 1 wt. 8 from the mass fraction of silicon particles in the matrix mixture in the end regions of the height of the cell walls.

The honeycomb blank is an intermediate product, in particular according to the method of the invention, which (disregarding process-related shrinkage effects) substantially already has the geometric shape and dimensions of the honeycomb body or honeycomb block according to the invention. This geometric shape is only slightly modified by pyrolysis and siliconization, wherein any modification may be taken into account experimentally or analytically. The subsequently provided steps of pyrolysis and siliconization do, however, modify the chemical composition of the honeycomb blank: the matrix is carbonized and the carbon is at least in part converted into SiC such that a ceramic composite material is produced.

The matrix mixture with which the cell walls of the honeycomb cells are impregnated may include a mass fraction of silicon particles of 20 wt. % to 60 wt. %, preferably 25 wt. % to 45 wt. %.

The matrix mixture may comprise at least one precursor for a thermosetting polymer, in particular a phenolic resin.

The silicon particles preferably have a grain size distribution of 0.001 to 1 mm and particularly preferably of 0.008 to 0.09 mm.

The honeycomb blank may be used for producing sandwich structures or be arranged between two cover layers and bonded to the cover layers. Carbonization and siliconization can be carried out on the bonded sandwich structure, so reducing process costs. The matrix mixture with which the cell walls of the honeycomb blank are impregnated may be partially crosslinked or incompletely cured or partially cured such that it is still fusible in the event of an increase in temperature and can bond with the cover layers. Application of an additional adhesive layer may be avoided in this way.

According to a further independent aspect, the invention further relates to a honeycomb blank which is suitable as an intermediate product in particular for producing a honeycomb body of fiber-reinforced silicon-based ceramics for fire-resistant lightweight structures.

The honeycomb blank comprises honeycomb cells with a cross-section in the L/W plane, in particular a polygonal, for example approximately hexagonal cross-section, wherein cell walls of the honeycomb cells are produced from a support material, in particular from a woven or laid fiber fabric, preferably of silica glass fibers, which is impregnated with a matrix mixture which according to the invention comprises at least one silicon-containing polymer precursor, in particular a polycarbosilane, a polycarbosiloxane, a polysiloxane, a polysilazane, a polysilane, a polycarbosilazane, a copolymer with two or more of the above-stated compounds and/or a mixture with two or more of the above-stated compounds.

The honeycomb blank is an intermediate product, in particular according to the method of the invention, which (disregarding process-related shrinkage effects) substantially already has the geometric shape and dimensions of the honeycomb body or honeycomb block according to the invention. This geometric shape is only slightly modified by pyrolysis, wherein any modification may be taken into account experimentally or analytically. The subsequently provided pyrolysis steps do, however, modify the chemical composition of the honeycomb blank: the matrix is carbonized, and the preceramic prepolymers or the polymer precursors are at least partially converted into corresponding silicon-based ceramic materials, for example into silicon carbide, silicon oxycarbide, silicon nitride, silicon carbonitride and/or silicon-boron carbonitride, such that a ceramic composite material is produced.

According to an independent aspect, the invention furthermore relates to a flat semi-finished product, in particular a "prepreg", as a curable intermediate product for producing fire-resistant fiber composite lightweight structures, in particular laminates such as for example cover layers for fire-resistant lightweight sandwich structures. The proposed semi-finished product has a support material which is impregnated with a carbon-containing matrix mixture, wherein the support material comprises a woven or laid fiber fabric, in particular comprises carbon fibers and/or ceramic fibers, and wherein the curable matrix mixture comprises at least one precursor for a thermosetting polymer, in particular a phenolic resin.

According to one aspect of the invention, the matrix mixture includes dispersed silicon particles.

The matrix mixture preferably includes a mass fraction of silicon particles of 20 wt. % to 60 wt. % and particularly preferably 25 wt. % to 45 wt. %.

The silicon particles may have a grain size distribution of 0.001 to 1 mm and in particular of 0.008 to 0.09 mm.

According to one aspect of the invention, the matrix mixture includes at least one silicon-containing polymer precursor, in particular a polycarbosilane, a polycarbosiloxane, a polysiloxane, a polysilazane, a polysilane, a polycarbosilazane, a copolymer with two or more of the above-stated compounds and/or a mixture with two or more of the above-stated compounds.

As in the case of the method proposed above, the matrix mixture in the semi-finished product furthermore in particular comprises at least one substance which can be crosslinked to yield a polymer. The precursor (s) may be partially crosslinked. The fibers may be C fibers and/or SiC fibers. The matrix mixture may be a solution and/or a suspension of an organic prepolymer or polymer precursors, in particular of a reactive resin or of a condensation resin in a solvent.

This curable resin composition may comprise further components, for example a curing agent. Curable means in the present case that the matrix mixture is technically not yet completely cured, but the curable matrix mixture may optionally be partially crosslinked or reticulated. The matrix mixture should in particular still be fusible. The matrix mixture in the flat semi-finished product or prepreg may be at the B stage, i.e. in a partially crosslinked, partially or incipiently gelled state.

The prepregs may have a tackiness of tack 0 to tack 2 and in particular of tack 0 or tack 1. The matrix mixture may be solid or pasty at room temperature (20° C.) but may be liquefied by an increase in temperature. The matrix mixture in the prepreg which is to be pressed to yield the laminate may, however, be at an advanced B stage, or in a highly prereacted state. The matrix mixture may be completely cured for example by heat treatment, i.e. transformed from the B stage to a C stage in which in the resin is polymerized, completely cured i.e. crosslinked and is no longer fusible and no longer curable.

The prepreg may thus be used for producing laminates of many different shapes. A plurality of prepreg layers or prepreg sheets may, for example, be stacked and pressed, in particular with exposure to a temperature which is sufficient for completely curing the resin or crosslinking agents of the polymer precursors with formation of a crosslinked thermosetting polymer.

The prepreg may also be used as an adhesive layer for bonding a honeycomb core to cover layers to yield a sandwich structure.

Not only woven but also laid fabrics may be considered as support material. In the present case, a laid fabric means a fabric which consists of one or more plies of nonwoven and/or unidirectionally arranged, in particular parallel oriented, fibers. A laid fabric for example also comprises a UD roving tape.

The mass fraction of fibers in the prepreg is preferably between 20 wt. % and 80 wt. %, in particular between 20 wt. % and 45 wt. %. This is intended to result in a sufficiently high matrix mass fraction, for example 20 to 60 wt. % matrix, in the finished cover layer, i.e. after lamination, pyrolysis and optionally siliconization. The fiber volume fraction in the laminate may amount to 15 vol. % to 75 vol. %.

Further details, features and advantages of the invention may be inferred from the following more detailed description of preferred embodiments with reference to the appended drawings in which.

Figure 1:
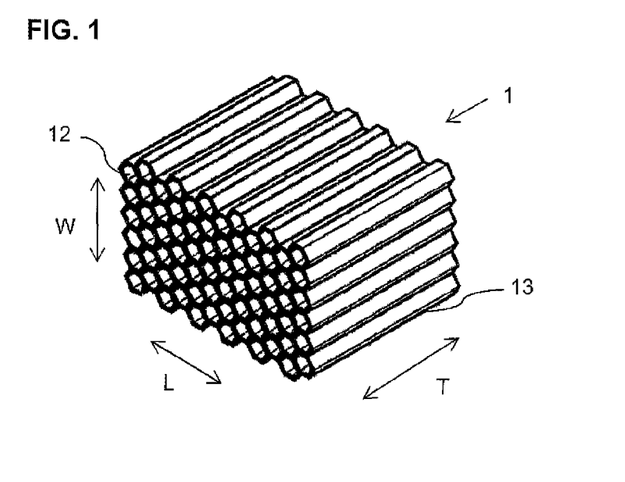
FIG. 1: shows a perspective view of the principle of an exemplary embodiment of a honeycomb body according to the invention.

FIG. 1 shows a block-type honeycomb body 1 with honeycomb cells 12 and the cell walls 13 thereof. The L direction (longitudinal direction), the W direction (width direction) and the T direction are shown by double-headed arrows. The T direction corresponds to the honeycomb height or thickness or the height of the cell walls 13. In this exemplary embodiment, the honeycomb cells 12 are technically hexagonal, i.e. they form a cross-sectionally hexagonal base area in the L/W plane. The honeycomb cells 12 are not shown here true to scale. The honeycomb body 1 is shown in its form subsequent to siliconization. The honeycomb body 1 may optionally subsequently be cut into flat honeycomb slices 29 (FIG. 2) transversely to the T direction.

Figure 2:
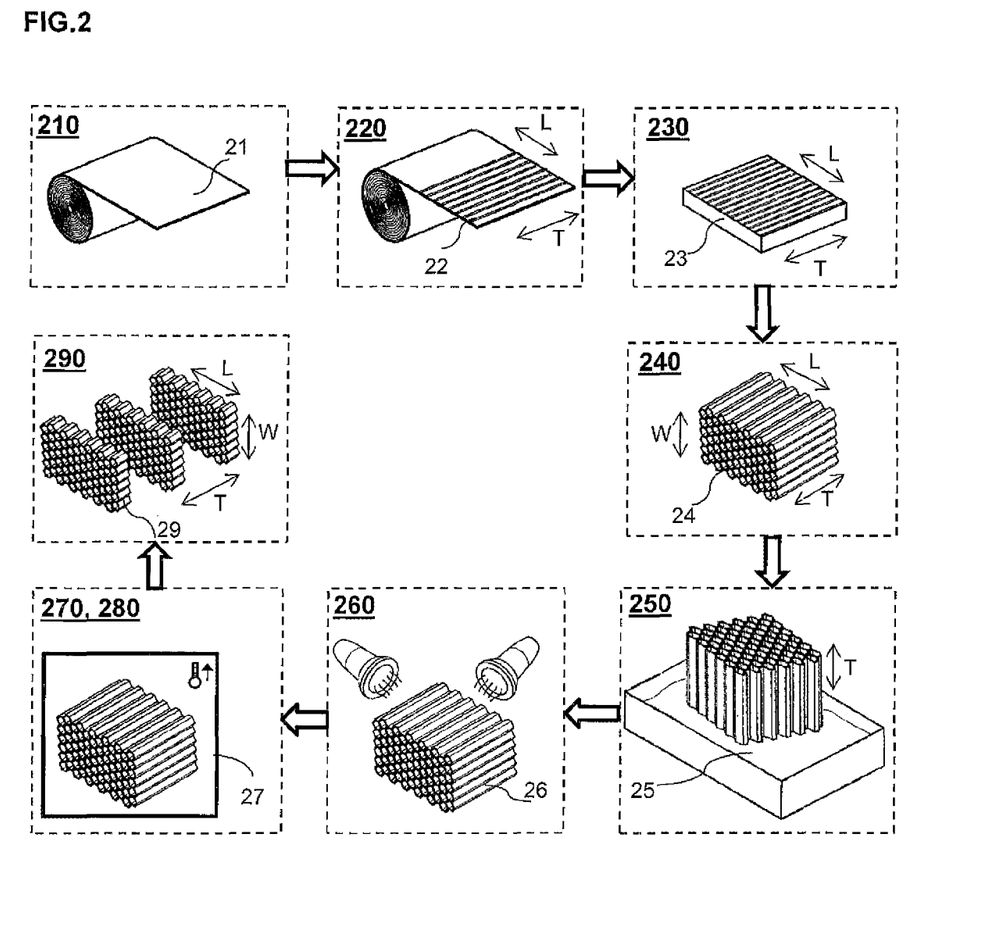
FIG. 2: shows a schematic process sequence with pictograms of a production method for a preferred exemplary embodiment of the honeycomb body according to the invention.

FIG. 2 shows a process diagram according to an exemplary embodiment of the production method according to the invention for a honeycomb body 1 which is composed of carbon fiber-reinforced SiC. Only the essential steps are shown and described here.

EXEMPLARY EMBODIMENT 1

A roll with a support material 21 is provided in step 210. The woven carbon fiber fabric Tenax® HTA40 200 tex (3K) Style 450-5 Aero is used as the support material 21 in this example. The fabric of the support material 21 is produced using a linen weave. In step 220, mutually parallel stripes 22 of an adhesive are applied, for example with a constant spacing, onto the unrolled support material 21 perpendicular to the L direction or the unrolling direction. An epoxy-phenolic based adhesive is used as the adhesive in this example. The stripes 22 are applied over the entire width of the support material 21. In step 230, the support material 21 is cut into sheets of identical size and, offset relative to one another in the L direction, for example by half the spacing of the adhesive stripes 22, the sheets are set down on one another to form a stack 23. The stack 23 is processed to form a cohesive block by partial or complete curing of the adhesive stripes 22 with exposure to pressure and heat in a press in accordance with a per se known process. In step 240, expansion in the W direction proceeds in per se known manner such that a honeycomb block 24 with technically hexagonal honeycomb cells, i.e. with honeycomb cells which have a hexagonal cross-section in the L/W plane, is obtained. The cell size of the honeycomb cells (cf. FIG. 1) in the L/W plane amounts for example to 9.6 mm. The height of the honeycomb block 24 in the T direction corresponds to the width of the roll of support material 21, and measures for example to 400-500 mm or optionally larger, such as for example 1000 mm. The width of the honeycomb block 24 in the W direction is determined by the expansion step and measures for example 700-900 mm and in further embodiments may also be substantially larger, for example 2440 mm. The length of the honeycomb block 24 in the L direction measures for example 400-600 mm and in further embodiments may also be substantially larger, for example 1220 mm. Before further processing, the honeycomb block 24 has for example a bulk density of approximately 50-60 kg/m$^3$.

In step 250, the honeycomb block 24 is soaked or impregnated with a matrix mixture 25, in this exemplary embodiment by completely immersing the honeycomb block 24 in a container, in which the matrix mixture 25 is prepared as a bath to a sufficient depth relative to the height of the honeycomb block 24. Other impregnating techniques are likewise possible. The honeycomb block 24 thus forms the support for the matrix applied by impregnation. In this example, the matrix mixture 25 comprises for example phenolic resin precursors dissolved in isopropanol. Bakelite® PF 1145, or Bakelite® PF 0247 DW 01, or also Bakelite® PF 6983 FW 01 from Hexion GmbH, Germany, may for example be used as the phenolic resin. The matrix mixture 25 furthermore comprises dispersed silicon particles of metallic silicon (Si) with a selected grain size distribution, for example in the range from 0.008 to 0.09 mm. The matrix mixture 25 is stirred such that the particles are dispersed. In particular for small particle sizes, however, continuous stirring is not necessary. In this exemplary embodiment, the mass fractions of phenolic resin precursors and silicon in the matrix mixture 25 in each case amount to 33 wt. %. The mass fraction of isopropanol in the matrix mixture 25 in this exemplary embodiment amounts to 30 wt. 8. The matrix mixture furthermore comprises 4 wt. % carbon nanoparticles in this exemplary embodiment.

As a result of impregnation, a honeycomb blank 26 impregnated with a silicon-containing matrix mixture is obtained. In step 260, the impregnated honeycomb blank 26 is precured at a temperature of 200-300° C., among other things to evaporate the solvent, in this case isopropanol. This results in at least partial crosslinking of the matrix mixture. The matrix mixture may also be completely crosslinked such that it can no longer melt.

In step 270, the precured honeycomb blank 26 is heated in a nitrogen-blanketed pyrolysis furnace 27 to the pyrolysis temperature, 950-1000° C., at atmospheric pressure for approximately 6-8 hours such that the organic constituents of the matrix mixture carbonize and an intermediate product is obtained. This further intermediate product has a support of carbon fibers embedded in a carbon matrix, wherein the matrix has embedded silicon particles.

In step 280, the intermediate product is raised, preferably in the same apparatus as in step 270 and without preceding cooling, to a siliconization temperature in the range from 1400-1550° C. The rate at the temperature is raised in steps 270 and 280 amounts for example to 1-5° C./min. The intermediate product is siliconized for approximately 4-7 hours at a temperature of 1400-1550° ° C. under a slight vacuum (approximately 1-5 mbar) with nitrogen flushing of the pyrolysis furnace. In step 280, the silicon particles in the matrix melt and liquid silicon forms the intended silicon carbide (SiC) with the adjacent carbon atoms of the matrix.

As a result of the siliconization in step 280, a honeycomb body 1 comprising the support of carbon fibers and the silicon carbide-containing matrix is obtained, wherein the fibers of the support are embedded in the matrix or the support and matrix form a ceramic fiber composite material. In this example, the matrix furthermore contains approximately 4 wt. % free carbon. The target bulk density of the honeycomb body is below 400 kg/m$^3$, in particular below 200 kg/m$^3$ and may even be 150 kg/m$^3$.

In step 290, the honeycomb body 1 may be cut for subsequent further processing into slices perpendicular to the cell walls of the honeycomb cells, i.e. perpendicular to the T direction. Honeycomb slices 29 of the desired height with the desired material properties are accordingly produced. Cutting may alternatively also proceed after partial curing in step 260 and before the pyrolysis step 270, such that for example a smaller process chamber may be used for steps 270 and 280.

Exemplary embodiment 2: In a further exemplary embodiment, an open-pored woven carbon fiber fabric preimpregnated with a matrix mixture is used for producing a honeycomb block by the expansion method. The mass fraction of carbon fiber in the preimpregnated fabric is approximately 60 wt. %. In this example, the matrix mixture contains an epoxy resin (for example HexFlow® RTM 6 from Hexcel Corp., USA, or EPIKOTE TM Resin M1-0479-JS or EPONOL™ Resin 7035 from Hexion GmbH, Germany) and a dispersed silicon powder in a mass ratio of 1.5 to 1. A honeycomb block is produced by the expansion method as described above according to steps 210, 220, 230 and 240. After the expansion step, the honeycomb block constitutes a partially coated support. In step 250, the expanded honeycomb block is soaked or impregnated with the matrix mixture by immersion in a container into which the matrix mixture has been introduced, wherein an impregnated honeycomb blank is obtained. The steps of pyrolysis 270 and siliconization 280, as well as of cutting 290, are then carried out as described above in relation to the first example.

Further polymer resins which the matrix mixture may contain are for example polyimide resins such as Skybond® 700 from Industrial Summit Technology Corp., USA, or cyanate ester reins, such as for example PT 30 from Lonza AG, Switzerland.

Figure 3:
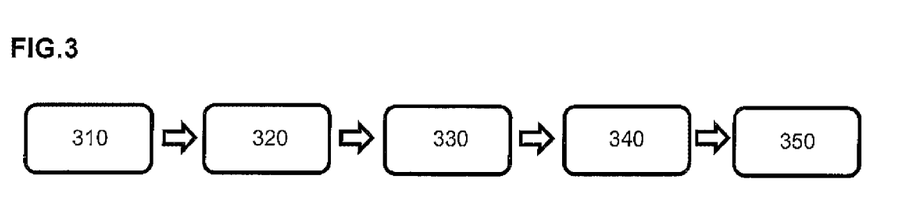
FIG. 3: shows a schematic process sequence as a block diagram relating to an exemplary embodiment of a production method for a fiber-reinforced, carbide ceramic sandwich component comprising a honeycomb core.

Further variations in material selection for support and matrix are application-dependent and likewise fall within the scope of the invention. FIG. 3 shows a process diagram for an exemplary production method for a fiber-reinforced carbide ceramic sandwich structure comprising a honeycomb core. In step 310, a honeycomb slice which has been produced as described above and two cover layers in the form of a laminate of carbon fiber-reinforced silicon carbide are provided. The laminate layers are produced by impregnating plies of a carbon fiber material, for example woven carbon fabric Injectex G 926 (Hexcel Corp.) or Tenax® HTA40 200 tex (3K) Style 450-5 (from Toho Tenax Europe GmbH, Germany), with a matrix mixture which comprises phenolic resin precursors and dispersed silicon particles, optionally stacking and pressing a plurality of impregnated plies with one another, followed by pyrolysis and siliconization (as above). In step 320, the honeycomb slice is externally provided with an adhesive on the honeycomb uprights and provided on both sides with the laminate layers in order to bond the laminate layers adhesively to the honeycomb slice. The above-stated matrix mixture comprising phenolic resin precursors and dispersed silicon particles may be used as the adhesive. In step 330, the laminate layers and the honeycomb slice are pressed to form a sandwich and then subjected to a pyrolysis step 340 and a siliconization step 350 in a suitable process furnace. This may in principle proceed as described above in relation to FIG. 2, such that the matrix mixture is carbonized and then siliconized between the layers. A heat-resistant lightweight sandwich structure of carbon fiber-reinforced silicon carbide which comprises a honeycomb core between two cover layers is obtained as a result.

In a further exemplary embodiment according to FIG. 3, the cover layers of an unpyrolyzed prepreg material are adhesively bonded to the honeycomb core and pressed to form a sandwich.

The sandwich is then pyrolyzed and siliconized essentially under the above-described conditions. It is also possible, using the matrix mixture, to adhesively bond an unpyrolyzed honeycomb blank in the form of a honeycomb slice to the unpyrolyzed cover layers of a prepreg-material in order to form a sandwich and then to pyrolyze and siliconize the sandwich in order to obtain a fiber-reinforced carbide ceramic sandwich structure.

Figure 4:
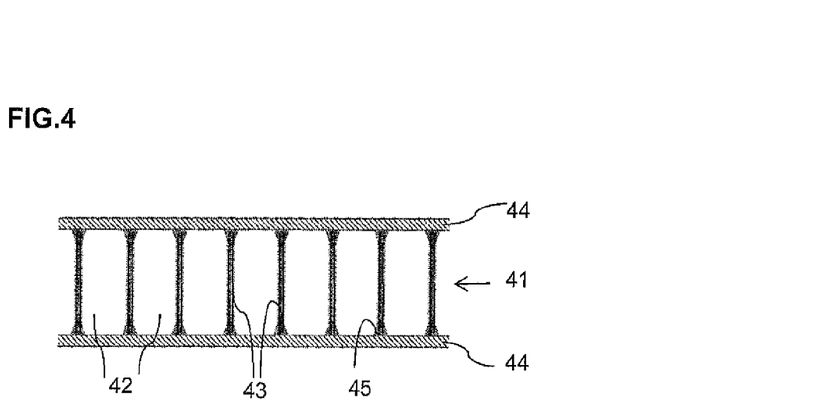
FIG. 4: shows a partial view of an exemplary embodiment of a lightweight sandwich structure produced according to the invention, in cross-section perpendicular to the L/W plane.

FIG. 4 shows a portion of a lightweight sandwich structure produced according the process sequence shown in the block diagram according to FIG. 3. The sandwich structure according to FIG. 4 has a honeycomb core 41 with honeycomb cells 42 with cell walls 43 of a carbon fiber-reinforced silicon carbide. The honeycomb core is produced according the method outlined in FIG. 2. The sandwich structure furthermore has two cover layers 44 of a carbon fiber-reinforced silicon carbide which may be provided as described in FIG. 3. The cover layers are bonded to the honeycomb core by an adhesive 45, the adhesive 45 comprising a high, preferably predominant proportion of silicon carbide in the finished sandwich structure.

A lightweight sandwich structure according to FIG. 4 may also be produced with a honeycomb body according to exemplary embodiment 3 (below).

Exemplary embodiment 3:

A roll with a support material 21 is provided in step 210. A woven silica glass or silicate glass fabric is used as the support material 21 in this example. In step 220, mutually parallel stripes 22 of an adhesive are applied, for example with a constant spacing, onto the unrolled support material 21 perpendicular to the L direction or the unrolling direction. An epoxy-phenolic based adhesive is used as the adhesive in this example. The stripes 22 are applied over the entire width of the support material 21. In step 230, the support material 21 is cut into sheets of identical size and, offset relative to one another in the L direction, for example by half the spacing of the adhesive stripes 22, the sheets are set down on one another to form a stack 23. The stack 23 is processed to form a cohesive block by partial or complete curing of the adhesive stripes 22 with exposure to pressure and heat in a press in accordance with a per se known process. In step 240, expansion in the W direction proceeds in per se known manner such that a honeycomb block 24 with technically hexagonal honeycomb cells, i.e. with honeycomb cells which have a hexagonal cross-section in the L/W plane, is obtained. The height of the honeycomb block 24 in the T direction corresponds to the width of the roll of the support material 21.

In step 250, the honeycomb block 24 is soaked or impregnated with a matrix mixture 25, in this exemplary embodiment by completely immersing the honeycomb block 24 in a container, in which the matrix mixture 25 is prepared as a bath to a sufficient depth relative to the height of the honeycomb block 24. Other impregnating techniques are likewise possible. The honeycomb block 24 thus forms the support for the matrix applied by impregnation. The matrix mixture 25 comprises in this example a functionalized polysiloxane, for example an alkoxysilane (for example Silmer TMS, 50 to 700 series, from Siltech, such as Silmer TMS C50 or Di-50). In this example, the matrix mixture comprises no solvent. A solvent, for example isopropanol, may however be used for adjusting viscosity. The preferred residence time in the dip bath amounts to 2 to 5 minutes.

As a result of impregnation, a honeycomb blank 26 impregnated with a matrix mixture is obtained. In step 260, the impregnated honeycomb blank 26 is precured at a temperature of 150-200° ° C. in a circulating air oven, among other things to evaporate the solvent, in this case isopropanol. This results in at least partial crosslinking of the matrix mixture. Depending on the bulk density to be achieved, this step may optionally be repeated a number of times.

In step 270, the precured honeycomb blank 26 is heated to the pyrolysis temperature, approximately 400-600° ° C., such that the siloxane chains of the matrix mixture are converted into Sioc ceramics. Pyrolysis is then continued at 800-900° C.

As a result, a honeycomb body 1 comprising the support of carbon fibers and the silicon oxycarbide matrix is obtained, wherein the fibers of the support are embedded in the matrix or the support and matrix form a ceramic fiber composite material.

Step 280 (see exemplary embodiment 1 or 2) is omitted here.

In step 290, the honeycomb body 1 may be cut for subsequent further processing into slices perpendicular to the cell walls of the honeycomb cells, i.e. perpendicular to the T direction. Honeycomb slices 29 of the desired height with the desired material properties are accordingly produced. Cutting may alternatively also proceed after partial curing in step 260 and before the pyrolysis step 270, such that for example a smaller process chamber may be used for steps 270 and 280.

Ceramic honeycomb body for lightweight structures and corresponding production method

LIST OF REFERENCE SIGNS

FIG. 1
L Longitudinal direction of the honeycomb body
W Width direction of the honeycomb body
T Honeycomb height or thickness or height of the cell walls of the honeycomb cells
1 Honeycomb body
12 Honeycomb cells
13 Cell walls
FIG. 2
21 Support material
22 Adhesive stripes
23 Stack
24 Honeycomb block
25 Matrix mixture
26 Honeycomb blank
27 Pyrolysis furnace
29 Honeycomb slice
Process steps:
210 Providing a roll of support material
220 Applying adhesive to the support material
230 Cutting the support material, stacking and adhesively bonding the sheets to form a block
240 Expanding the block
250 Immersing the honeycomb block in the matrix mixture
260 Precuring the honeycomb blank
270 Pyrolysis or carbonization
280 Siliconization
290 Cutting the honeycomb body into honeycomb slices
FIG. 3
Method steps:
310 Providing the honeycomb slice and cover layers
320 Placing the adhesive and arranging the honeycomb slice between the cover layers
330 Pressing the cover layers and honeycomb slice to form a sandwich
340 Pyrolysis
350 Siliconization
FIG. 4
41 Honeycomb core
42 Honeycomb cells
43 Cell walls
44 Cover layers
45 Adhesive

What is claimed is:

1. A honeycomb body (1) of a composite material for fire-resistant lightweight structures, for use as a core (41) or for producing a core (41) between two cover layers (44) of a lightweight sandwich structure, the honeycomb body (1) comprising honeycomb cells (12) with a cross-section in the L/W plane, cell walls (13) of the honeycomb cells (12) being produced from a composite material, the composite material at least comprising
  a support, and
  a matrix, the support being embedded in the matrix,
  wherein the matrix comprises a silicon-based ceramic material selected from the group consisting of silicon carbide, silicon oxycarbide, silicon nitride, silicon carbonitride and silicon-boron carbonitride, wherein, over the entire height of the cell walls (13) in the T direction perpendicular to the L/W plane, the matrix has a mass fraction of the silicon-based ceramic material of at least 30 wt. %, wherein the mass fraction of the silicon-based ceramic material in the matrix in the central region along the T direction deviates by less than 20 wt. % from the mass fraction of the silicon-based ceramic material in the matrix in the end regions of the height of the cell walls (13),
  wherein a mass fraction of free carbon in the matrix amounts to at least 1 wt. %.

2. The honeycomb body (1) as claimed in claim 1, wherein
  a mass fraction of the support in the composite material amounts to 5 wt. % to 80 wt. %.

3. The honeycomb body (1) as claimed in claim 1, wherein
  the support is produced from fibers.

4. The honeycomb body (1) as claimed in claim 3, wherein
  the fibers of the support are carbon fibers and/or ceramic fibers.

5. The honeycomb body (1) as claimed in claim 3, wherein a fiber fineness of the support material amounts to between 1 K and 50 K.

6. The honeycomb body (1) as claimed in claim 1, wherein the honeycomb cells (12) are hexagonal with a free diameter in the L/W plane of ≤ 50 mm.

7. A method for producing a honeycomb body (1), as claimed in claim 1, comprising:
  providing a support material (21),
  forming the support material (21) into a support (24) in the form of a honeycomb with honeycomb cells, the cell walls of which are formed from the support material (21),
  impregnating the support (24) with a carbon-containing matrix mixture (25) which comprises dispersed silicon particles such that the cell walls of honeycomb cells are impregnated with the silicon particle-containing matrix mixture (25) to provide a corresponding honeycomb blank (26), wherein the mass fraction of silicon particles in the matrix mixture (25) amounts to 20 wt. % to 60 wt. %,
  heating the impregnated honeycomb blank (26) to a pyrolysis temperature and carbonizing the matrix, and
  heating to a siliconization temperature to liquefy the silicon particles and siliconizing the carbonized matrix to form silicon carbide.

8. The method as claimed in claim 7, wherein the support material (21) is produced in the form of an open-pored air-permeable fiber structure and in particular comprises carbon fibers and/or ceramic fibers.

9. The method as claimed in claim 7, wherein the support material (21) comprises a woven fabric, with a porosity of 2 vol. % to 40 vol. % and/or with a mesh size of 100 to 800 µm.

10. The method as claimed in claim 7, wherein the silicon particles have a grain size distribution of 0.001 to 1 mm.

11. The method as claimed in claim 7, wherein the matrix mixture (25) comprises at least one precursor for a thermosetting polymer.

12. The method as claimed in claim 7, wherein impregnation is followed by a partial or complete curing step, wherein the honeycomb blank (26) impregnated with the matrix mixture (25) is at least precured by exposure to heat.

13. The method as claimed in claim 7, wherein the support is produced in the form of a honeycomb block (24) by an expansion method comprising the steps of:
  providing a flat support material (21),
  applying parallel stripes of an adhesive (22) which extend in the T direction or in the direction of the width of the roll over the width of the roll and are spaced apart from one another at regular distances in the L direction or longitudinal direction of the roll perpendicular to the T direction,
  cutting the roll into sheets,
  laying the sheets on one another to form a stack (23),
  partially or completely curing the adhesive, such that the stack (23) is bonded to form a cohesive block and,
  expanding the stack in the W direction or in the stack height direction, such that a honeycomb block (24) with honeycomb cells is obtained.

14. The method as claimed in claim 7, wherein the matrix mixture (25) comprises dispersed additives.

15. The method as claimed in claim 7, wherein before or after pyrolysis or after siliconization, the honeycomb body (1) is cut into honeycomb slices (29) transversely to the cell walls of the honeycomb cells.

16. A heat-resistant, lightweight sandwich structure, comprising a core which is bonded to two cover layers of a ceramic fiber composite material, wherein the core comprises the honeycomb body (1) as claimed in claim 1.

17. The honeycomb body (1) as claimed in claim 1, wherein the support is a woven or laid fabric made of fibers.

18. A honeycomb body (1) of a composite material for fire-resistant lightweight structures, for use as a core (41) or for producing a core (41) between two cover layers (44) of a lightweight sandwich structure, the honeycomb body (1) comprising honeycomb cells (12) with a cross-section in the L/W plane, cell walls (13) of the honeycomb cells (12) being produced from a composite material, the composite material at least comprising
  a support, and
  a matrix, the support being embedded in the matrix,
  wherein the matrix comprises a silicon-based ceramic material selected from the group consisting of silicon carbide, silicon oxycarbide, silicon nitride, silicon carbonitride and silicon-boron carbonitride, wherein, over the entire height of the cell walls (13) in the T direction perpendicular to the L/W plane, the matrix has a mass fraction of the silicon-based ceramic material of at least 30 wt. %, wherein the mass fraction of the silicon-based ceramic material in the matrix in the central region along the T direction deviates by less than 20 wt. % from the mass fraction of the silicon-based ceramic material in the matrix in the end regions of the height of the cell walls (13), wherein the support is produced from glass fibers.

19. The honeycomb body (1) as claimed in claim 18 wherein a mass fraction of free silicon in the matrix amounts to at most 15 wt. %.

20. A method for producing a honeycomb body (1), in particular as claimed in claim 18, comprising:
  providing a support material (21), forming the support material (21) into a support (24) in the form of a honeycomb with honeycomb cells, the cell walls of which are formed from the support material (21), impregnating the support (24) with a matrix mixture (25) which comprises at least one silicon-containing polymer precursor which is, a polycarbosilane, a polycarbosiloxane, a polysiloxane, a polysilazane, a polysilane, a polycarbosilazane, a copolymer with two or more of the above-stated compounds and/or a mixture with two or more of the above-stated compounds, such that the cell walls of the honeycomb cells are impregnated with the matrix mixture (25), to provide a corresponding honeycomb blank (26), heating the impregnated honeycomb blank (26) to a pyrolysis temperature, of $\leq 1100°$ C. to form a matrix which contains a silicon-based ceramic material, wherein the support material (21) has a form of an open-pored air-permeable fiber structure and comprises glass fibers.

21. The method as claimed in claim 20, wherein the support material (21) comprises silicate glass fibers.

22. The method as claimed in claim 20, wherein the matrix mixture (25) comprises polyborazylene.

* * * * *